United States Patent [19]

Tazuma

[11] 3,859,376

[45] Jan. 7, 1975

[54] SEPARATION OF PIPERYLENES

[75] Inventor: James T. Tazuma, Stow, Ohio

[73] Assignee: The Goodyear Tire & Rubber Company, Akron, Ohio

[22] Filed: Oct. 18, 1973

[21] Appl. No.: 407,699

[52] U.S. Cl. .......................................... 260/681.5 C
[51] Int. Cl. ............................................... C07c 7/10
[58] Field of Search ............................. 260/681.5 C

[56] References Cited
UNITED STATES PATENTS

| | | | |
|---|---|---|---|
| 2,322,281 | 6/1943 | Craig | 260/681.5 C |
| 3,268,613 | 8/1966 | Suzuki | 260/681.5 C |
| 3,395,192 | 7/1968 | Long | 260/681.5 C |

Primary Examiner—Paul M. Coughlan, Jr.
Attorney, Agent, or Firm—F. W. Brunner; J. Y. Clowney; R. A. Thompson

[57] ABSTRACT

A method of separating 1,cis-3-piperylene from 1,trans-3-piperylene by contacting said piperylenes with silver nitrate or silver perchlorate, thereby forming the cis isomer and subsequently separating the cis isomer from the solution.

1 Claim, No Drawings

SEPARATION OF PIPERYLENES

This invention relates to a method of separating isomeric hydrocarbons, more specifically to a method of separating 1,trans-3-piperylene from 1,cis-3-piperylene.

Isomerism in a chemical compound is the property of having the same percentage composition as another compound yet differing in the relative positions of the atoms within the molecule. This usually results in different physical and chemical properties of the two compounds.

The particular hydrocarbon compounds of the present invention possess geometrical isomerism. The trans form of 1,3-pentadiene or piperylene can be depicted as

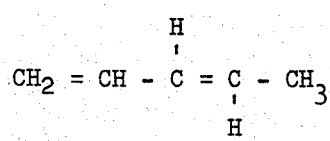

in which the two single hydrogens on the carbon atoms forming the internal double bond are on opposite sides of the double bond. The cis structure of 1,3-pentadiene or piperylene can be depicted as

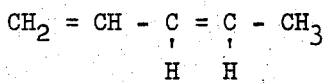

where the two single hydrogens in the carbon atoms forming the internal double bond are on the same side of the double bond.

The cis isomer of piperylene has certain properties that make it desirable to be able to isolate it and utilize it in a relatively pure form.

The separation of cis-piperylene from trans-piperylene is difficult to accomplish by heating or distillation techniques due to the narrow difference in their boiling points, as 1,trans-3-piperylene boils at 42.032°C. while 1,cis-3-piperylene boils at 44.068°C. In attempting to separate the cis-isomer from the trans-isomer where the cis-isomer is not the major constituent but is the desired isomer, boiling would not be a practical route. Other methods of separation, although they may be used, have their disadvantages and may prove to be too costly.

This invention offers a simple, yet efficient, method of separating the cis-isomer from the trans-isomer. Thus, this invention provides a method whereby the cis-isomer can be isolated in a pure form which is simple, operable, and results in little loss of the separating agent.

Thus, according to the invention, 1,cis-3,-piperylene can be separated from 1,trans-3-piperylene by contacting a mixture of 1,cis-3 and 1,trans-3-piperylenes with silver perchlorate or silver nitrate, thereby forming a silver perchlorate. 1,cis-3-piperylene complex or silver nitrate. 1,cis-3-piperylene complex which can be isolated from the 1,trans-3-piperylene solution.

The separation process is usually conducted in a solvent. A preferable solvent is one in which both the piperylenes and the silver nitrate or silver perchlorate are soluble but the cis-isomer silver salt complex has only limited solubility. Representative of the more preferred solvents which exhibit these properties and can be utilized in this invention are ethanol, methanol, 3-methyl-1-butanol and isopropanol. Also, ethyl acetate, acetone and benzene may be utilized in this invention.

The amount of silver nitrate or silver perchlorate which is contacted with the piperylenes is not critical, but in order to effect the separation with some efficiency, the amount of silver nitrate or silver perchlorate should be enough to remove a fair amount of the desired isomer.

The mixing of the cis and trans piperylenes, silver nitrate or silver perchlorate, and solvent can be carried out at room temperature with the immediate complex formation and some precipitation, however, the isolation step of removing the silver salt 1,cis-3-piperylene complex can be conducted at a lower temperature. The lower the temperature, the more silver salt 1,cis-3-piperylene complex will be forced out of solution.

It should be understood that the complex is formed at room temperature and that some of the complex will precipitate out at room temperature. But in order to obtain a larger crop of crystals, and from a practical aspect, the lowering of the temperature by means of ice in water system is very effective. In fact, one may go even so low as to the freezing point of the solvent. However, this may prove to be impractical and costly for the expense of buying refrigeration equipment to obtain the small additional amount of complex crystals would not be worth it. The crystals can be effectively precipitated out of solution down to a temperature of about −20°C. by an ice water bath. The resulting complex can be readily decomposed by heating to above 50°C. thus providing another advantage of this invention in that the silver nitrate or silver perchlorate can be used over after releasing the 1,cis-3-piperylene from the complex.

In order to effectively isolate the 1,cis-3-piperylene from a mixture of the two piperylene isomers, the cis-isomer content should be above 25 percent. Although this invention effectively separates the cis-isomer from the trans-isomer it also effectively isolates the cis-isomer from other impurities that might be present in the mixture.

The practice of this invention is further illustrated by reference to the following examples which are intended to be representative rather than restrictive of the scope of this invention.

EXAMPLE I

This example shows how the silver nitrate selectively separates the cis and trans-isomers of piperylene.

To an equimolar solution of cis- and trans-piperylene [20 milliliters (mls)] was added 5.0 mls. of ethanol and 5 grams (gms) of silver nitrate. The solution was cooled to 14°C. and yellow crystals (3.6 gms) were obtained. Analysis of percent silver nitrate in the complex: theoretical is 71 percent, while it was actually found to contain 72 percent silver nitrate. The cis-piperylene obtained from the cis-piperylene silver nitrate complex was not contaminated with ethanol or trans-piperylene. The same procedure was repeated two more times with 5 gms. of silver nitrate added at each stage.

Second crop of crystals—5.1 gms.

Third crop of crystals—2.0 gms.

The second and third crops of complex crystals yielded cis-piperylene which contained trace amounts of ethanol and trans-piperylene.

The yellow crystals were heated to between 50°C. and 55°C., thus destroying the complex and releasing the cis-piperylene and rendering the silver nitrate available for furthering complexing. The amount of the cis-piperylene recovered by this process was about 3 gms. or 4.25 mls. which would be about 42.5 percent of that amount initially in the equimolar piperylene mixture.

While certain representative embodiments and details have been shown for the purpose of illustrating the invention, it will be apparent to those skilled in this art that various changes and modifications may be made therein without departing from the spirit or scope of the invention.

What is claimed is:

1. A one-step process for selectively removing 1,cis-3-piperylene from 1,trans-3-piperylene by contacting said piperylenes with silver perchlorate or silver nitrate in a solvent solution of ethanol, methanol, 3-methyl-1-butanol or isopropanol or mixtures thereof whereby forming a silver perchlorate. 1,cis-3-piperylene complex or a silver nitrate. 1,cis-3-piperylene complex, separating said complexes and subsequently dissociating said complexes to recover said 1,cis-3-piperylene.

* * * * *

UNITED STATES PATENT OFFICE
CERTIFICATE OF CORRECTION

PATENT NO. : 3,859,376
DATED : January 7, 1975
INVENTOR(S) : James J. Tazuma

It is certified that error appears in the above-identified patent and that said Letters Patent are hereby corrected as shown below:

Col. 2, line 13, center a dot between "salt" and "1,cis" to read -- salt · 1,cis-3-piperylene --;

Col. 2, line 15, center a dot between "salt" and "1,cis" to read -- salt · 1,cis-3 --;

Claim 1, line 6, remove the period after "perchlorate" and replace with a dot centered between "perchlorate" and "1,cis" to read -- perchlorate · 1,cis --; and Claim 1, line 7, remove the period after "nitrate" and replace with a dot centered between "nitrate" and "1,cis" to read -- nitrate · 1,cis --.

Signed and sealed this 15th day of July 1975.

(SEAL)
Attest:

RUTH C. MASON
Attesting Officer

C. MARSHALL DANN
Commissioner of Patents
and Trademarks